United States Patent
Costa et al.

(10) Patent No.: US 10,331,457 B2
(45) Date of Patent: Jun. 25, 2019

(54) BYTE-ADDRESSABLE NON-VOLATILE READ-WRITE MAIN MEMORY PARTITIONED INTO REGIONS INCLUDING METADATA REGION

(71) Applicant: HEWLETT-PACKARD DEVELOPMENT COMPANY, L.P., Houston, TX (US)

(72) Inventors: Carlos Haas Costa, Porto Alegre (BR); Taciano Dreckmann Perez, Porto Alegre (BR); Diego Rahn Medaglia, Porto Alegre (BR); Mauricio Nunes Porto, Porto Alegre (BR); Roberto Bender, Porto Alegre (BR); Joao Claudio Ambrosi, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 90 days.

(21) Appl. No.: 15/105,152

(22) PCT Filed: Jan. 22, 2014

(86) PCT No.: PCT/US2014/012433
§ 371 (c)(1),
(2) Date: Jun. 16, 2016

(87) PCT Pub. No.: WO2015/112126
PCT Pub. Date: Jul. 30, 2015

(65) Prior Publication Data
US 2016/0321083 A1    Nov. 3, 2016

(51) Int. Cl.
*G06F 9/4401* (2018.01)
*G06F 3/06* (2006.01)
*G06F 12/14* (2006.01)

(52) U.S. Cl.
CPC .......... *G06F 9/4406* (2013.01); *G06F 3/0604* (2013.01); *G06F 3/0626* (2013.01);
(Continued)

(58) Field of Classification Search
CPC .. G06F 9/4406; G06F 12/1408; G06F 3/0604; G06F 3/0626; G06F 3/0644;
(Continued)

(56) References Cited

U.S. PATENT DOCUMENTS 5,247,658 A * 9/1993 Barrett .............. G06F 17/30952
5,359,724 A * 10/1994 Earle ................... G06F 12/0207
(Continued)

FOREIGN PATENT DOCUMENTS

| CN | 101421701 | 4/2009 |
| CN | 102187283 | 9/2011 |
| WO | WO-2004107168 A1 | 12/2004 |

OTHER PUBLICATIONS

Condit, et al.; "Better I/o Through Byte-addressable, Persistent Memory", < http://www.eecs.harvard.edu/cs261/notes/condit-2009.html >, 2009.
(Continued)

*Primary Examiner* — Jaweed A Abbaszadeh
*Assistant Examiner* — Brian J Corcoran
(74) *Attorney, Agent, or Firm* — HPI Patent Department

(57) ABSTRACT

In one example, a computer having a processor and a byte-addressable non-volatile read-write main memory. The memory is partitioned into plural regions, each region having at least one defined operational property. At least one of the regions is a metadata region to store plural data sets. Each data set specifies a location in memory, and the at least one operational property, of a corresponding one of the regions.

20 Claims, 7 Drawing Sheets

(52) U.S. Cl.
CPC .......... *G06F 3/0644* (2013.01); *G06F 3/0673* (2013.01); *G06F 9/4401* (2013.01); *G06F 9/442* (2013.01); *G06F 12/1408* (2013.01); *G06F 2212/1052* (2013.01); *G06F 2212/402* (2013.01)

(58) Field of Classification Search
CPC ...... G06F 3/0673; G06F 9/4401; G06F 9/442; G06F 2212/1052; G06F 2212/402
See application file for complete search history.

(56) References Cited

U.S. PATENT DOCUMENTS

| | | | |
|---|---|---|---|
| 5,754,817 A | 5/1998 | Wells et al. | |
| 6,038,636 A * | 3/2000 | Brown, III | G06F 12/0246 711/103 |
| 7,539,706 B1 * | 5/2009 | Campbell | G06F 17/302 |
| 8,205,070 B2 | 6/2012 | Toelkes | |
| 8,516,271 B2 | 8/2013 | Faraboschi | |
| 8,522,004 B2 | 8/2013 | Borras | |
| 2003/0163631 A1 * | 8/2003 | Aasheim | G06F 12/0246 711/103 |
| 2006/0242398 A1 | 10/2006 | Fontijn et al. | |
| 2007/0239977 A1 * | 10/2007 | Wu | G06F 9/4403 713/2 |
| 2008/0189490 A1 * | 8/2008 | Cheon | G06F 12/0246 711/144 |
| 2008/0270730 A1 | 10/2008 | Lasser et al. | |
| 2008/0288712 A1 | 11/2008 | Cornwell et al. | |
| 2009/0150599 A1 | 6/2009 | Bennett | |
| 2010/0058045 A1 | 3/2010 | Borras et al. | |
| 2010/0106754 A1 * | 4/2010 | Condit | G06F 12/0804 707/822 |
| 2010/0185705 A1 * | 7/2010 | Bansal et al. | G06F 17/30218 707/822 |
| 2011/0187771 A1 * | 8/2011 | Helterline | B41J 29/38 347/6 |
| 2012/0110278 A1 | 5/2012 | Davis | |
| 2012/0151125 A1 | 6/2012 | Yang | |
| 2012/0290779 A1 | 11/2012 | Eleftheriou et al. | |
| 2013/0042057 A1 | 2/2013 | Sinclair et al. | |
| 2013/0073789 A1 | 3/2013 | Khmelnitsky et al. | |
| 2013/0159602 A1 | 6/2013 | Adams et al. | |
| 2013/0275661 A1 * | 10/2013 | Zimmer | G06F 12/0246 711/103 |
| 2013/0304979 A1 * | 11/2013 | Zimmer | G06F 13/14 711/103 |
| 2013/0304980 A1 * | 11/2013 | Nachimuthu | G06F 12/0246 711/103 |
| 2014/0010014 A1 | 1/2014 | Cornwell et al. | |
| 2014/0082262 A1 * | 3/2014 | Nachimuthu | G06F 12/00 711/103 |
| 2014/0181367 A1 * | 6/2014 | Gries | G06F 12/0246 711/103 |
| 2014/0297938 A1 * | 10/2014 | Puthiyedath | G06F 12/08 711/105 |
| 2015/0006871 A1 * | 1/2015 | Nachimuthu | G06F 12/1408 713/2 |
| 2017/0139827 A1 * | 5/2017 | Crossland | G06F 12/0866 |

OTHER PUBLICATIONS

Ferreira, A., et al.; "Using PCM in Next-generation Embedded Space Applications"; Apr. 12, 2010; pp. 153-162.

Moraru, et al.; "Persistent, Protected and Cached: Building Blocks for Main Memory Data Stores", < http://www.pdl.cmu.edu/PDL-FTP/NVM/CMU-PDL-11-114v2.pdf >, Nov. 2012.

Park, Y.; "High-Performance Scalable Flash File System Using Virtual Metadata Storage with Phase-Change RAM"; Mar. 2011; pp. 321-334.

Wu, X., et al.; "SCMFS : A File System for Storage Class Memory"; Nov. 12, 2011; 11 pages.

Dhiman G et al: "PDRAM: A hybrid PRAM and DRAM main memory system", Design Automation Conference, 2009. Jul. 26, 2009 (Jul. 26, 2009), pp. 664-669, XP031522440.

Haris Volos et al: "Mnemosyne", Asplos XVI: 16th Int'l Conf on architectural support for programming languages and operating systems, Mar. 5, 2011, pp. 91-104.

Lulian Moraru et al: "Consistent, durable, and safe memory management for byte-addressable non volatile main memory", ACM, Nov. 3, 2013, pp. 1-17.

SCMFS : A File System for Storage Class Memory, 2011, High Performance Computing, Networking, Storage and Analysis (SC), IEEE, Nov. 12, 2011, pp. 1-11.

* cited by examiner

BYTE-ADDRESSABLE NON-VOLATILE READ-WRITE MAIN MEMORY PARTITIONED INTO REGIONS INCLUDING METADATA REGION

BACKGROUND

Many computer systems use separate technologies for main memory and secondary storage. The main memory typically uses a volatile memory technology, such as Dynamic Random Access Memory (DRAM), for example. Since a volatile memory does not retain its contents once power is removed (absent additional components in the computer system such as a battery backup mechanism that can maintain memory contents for a finite period of time with added cost and complexity), the software for the computer system is typically stored in secondary storage that uses a non-volatile memory technology such as Flash memory Solid-State Drives (SSDs) or magnetic Hard Disk Drives (HDDs), for example. As a result of this arrangement, the computer system contains multiple different types of memory, with added cost and complexity.

DETAILED DESCRIPTION

Figure 1:
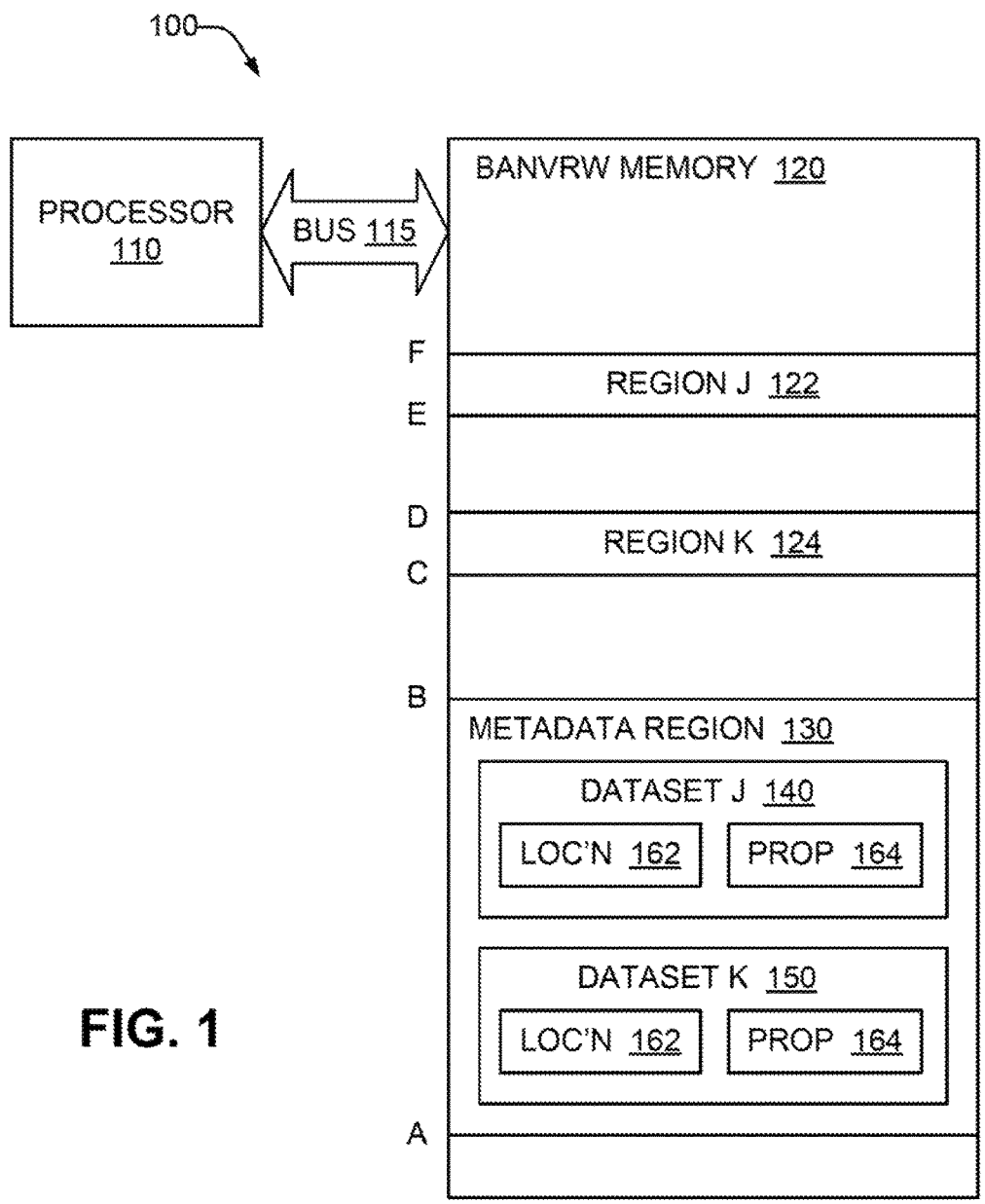
FIG. 1 is a block diagram of a computer having a byte-addressable non-volatile read-write main memory, in accordance with an example of the present disclosure.

There can be cost, complexity, time, and other disadvantages associated with a computer system that has separate technologies for main memory and secondary storage. In addition, since individual bytes of these secondary storage devices are typically not directly accessible by the processor of the computer system, and cannot be accessed by the processor as fast as from DRAM, certain contents of the secondary storage devices are first copied from secondary storage to main memory when power is applied to the computer system. These portions may include, for example, the operating system of the computer. These operations typically lengthen the boot-up time of the computer.

As defined herein and in the appended claims, a "main memory" may be broadly understood to mean a memory in which individual bytes of data can be directly addressed, and read or written, by a processor of the computer system, regardless of the word size employed by the processor. In addition, while a "byte" may typically be eight bits, in some examples a byte may refer to a larger or smaller set of multiple bits.

New, byte-addressable non-volatile memory technologies are becoming available that are cheaper in cost, faster in access time, and denser in bytes per unit volume than prior ones. It is also expected that the cost, access times, and densities of these memories will approach and exceed those of DRAM. Examples of such memories include, but are not limited to, Resistive Random Access Memory (RRAM), Memristors, Phase Change Random Access Memory (PCM, PCRAM, PRAM), Magnetoresistive Random Access Memory (MRAM), and Spin Transfer Torque Random Access Memory (STTRAM), to name a few. Such memories can be used as persistent main memory (PMM) in a computer system. As defined herein and in the appended claims, a "persistent" or "non-volatile" main memory may be broadly understood to mean a main memory which retains its contents across a power-cycling of the computer system. Separate secondary storage, which in some examples is not byte-addressable but rather block-addressable, may be omitted from such a computer system, because software such as the operating system or hypervisor, application program, and their associated persistent data files can be stored in PMM and retained across power-cyclings of the computer system. This can advantageously make the computer system less complex, less expensive, and faster to boot-up.

Referring now to the drawings, there is illustrated an example of a computer constructed in accordance with the present disclosure in which a processor is communicatively coupled to a byte-addressable non-volatile read-write main memory which is partitioned into plural regions. Each region has at least one defined operational property. At least one of the regions is a metadata region which is configured to store plural data sets. Each data set specifies a location in memory of a corresponding one of the plural regions, and the at least one operational property of the corresponding region. A boot loader, and an operating system and/or hypervisor, are stored in one or more of the regions, and are executed during a boot process of the computer.

An operating system is a set of software that manages hardware resources of the computer, and provides services to other programs which execute on the computer. The operating system is considered to be a native (also called a "bare metal") program which runs conceptually "on top" of the hardware and can control it directly, while the other programs that execute on the computer typically access the hardware resources through requests made to the operating system. A hypervisor is a set of software that creates and runs virtual machines, which can be considered "software computers" that emulate the specifications, architecture, and operation of another computer. A hypervisor can also be a native, "bare metal" program, or alternatively may be hosted by an operating system which it runs "on top" of. The term "hypervisor", as used herein and in the appended claims as the "higher-level program", refers to, a native, "bare metal" program hypervisor.

Considering now in further detail a computer, and with reference to FIG. 1, a computer 100 has a processor 110 which is coupled to a byte-addressable non-volatile read-write (BANVRW) main memory 120 via a bus 115. The main memory 120 is partitioned into plural regions, one of which is a metadata region. Three example regions are illustrated: region J 122, region K 124, and metadata region 130. The metadata region 130 stores plural data sets. Two example datasets are illustrated: data set J 140 (which is associated with region J 122) and data set K 150 (which is associated with region K 124).

The metadata region 130 is usable by the processor 110 (as instructed by programs such as a boot loader for example) to identify the location and operational property/properties of regions. Each data set 140, 150 has a location 162 that specifies the address range (or ranges) of the memory 120 which constitute the respective region 122, 124. Each data set 140, 150 also has an operational property 164 that specifies the address range (or ranges) of the memory 120 which correspond to the respective region 122, 124. In some examples there may be a data set for the metadata region, while in other examples such a data set may be omitted where the metadata region 130 is located at a predetermined fixed. This address may, in some, examples, be predetermined by the architecture of the computer, and/or may be known to the processor 110 or determinable by the processor 110 as instructed by software.

Each region 122, 124, 130 has at least one defined operational property associated with it. A number of different operational properties 164 can be defined. One operational property 164 may be at least one type of permissible access by the processor 110 to memory addresses within the corresponding region. Such permissible access may include read access, write access, or both read and write access.

Another operational property 164 of the region may be a content retention property that specifies how the contents of a region 122, 124, 130 are treated in response to a shutdown of the computer 100. The term "shutdown" may be broadly understood to mean the termination of execution of the operating system or hypervisor to such an extent that the computer 100 is rebooted before it can again be used. To once again use the computer 100, the shutdown may be followed by a "warm" reboot of power to the computer was not cycled off and then on), or a "cold" reboot (if power to the computer was cycled). The content retention property may specify that data in that region 122, 124, 130 of the memory 120 is to be maintained in response to a shutdown. Maintaining the data contents could be specified, for example, for a region which contains one or more programs of instructions that are executable by the processor 110. The content retention property may alternatively specify that data in that region is to be, discarded in, response to a shutdown. This could be specified, for example, for a region which is used for temporary data during the execution of programs. Temporary data is data which is not expected by programs to be valid following a shutdown. The temporary data may be generated and/or used by one or more of the boot loader, the operating system, the hypervisor, and/or other programs running under control of the operating system and/or the hypervisor.

In some cases, the temporary data may be passively discarded in such cases, the relevant programs expect the temporary data to have been stored in volatile memory, and so do not expect that temporary data from the prior boot to still be valid following the current boot. In other cases, the temporary data may be actively discarded, for example during the shutdown process. In active discarding, the contents of the corresponding non-volatile region may be overwritten, or otherwise invalidated or made inaccessible. Active discarding may be advantageous in situations where the temporary data contains sensitive information that is to be protected from surreptitious access such as, for example, removal of the main memory from the computer system when it is powered off.

Another operational property 164 may be an encryption type that is applied to the contents of the corresponding region. Encryption provides another mechanism by which sensitive information may be protected. Encryption may be used to protect sensitive information—data and/or programs—that persists across a shutdown, from a prior boot of the computer to a subsequent one. The encryption type may specify that no encryption, or a particular type of encryption, is applied to the region. Encryption can also allow another form of passive discarding memory contents, by means of discarding the encryption key(s), thus rendering the memory contents indecipherable and thus unusable.

As discussed subsequently in greater detail with reference to FIG. 2, the computer 100 enforces the operational property or properties of the plural regions in accordance with the plural data sets 140, 150 of the metadata region 130.

The metadata region 130 advantageously makes the memory 120 self-describing. In other words, the processor 110, as instructed by a boot loader or other programs, can determine the location and properties of plural regions into which the memory 120 has been partitioned by accessing and interpreting the data sets of the metadata region 130.

Figure 2:
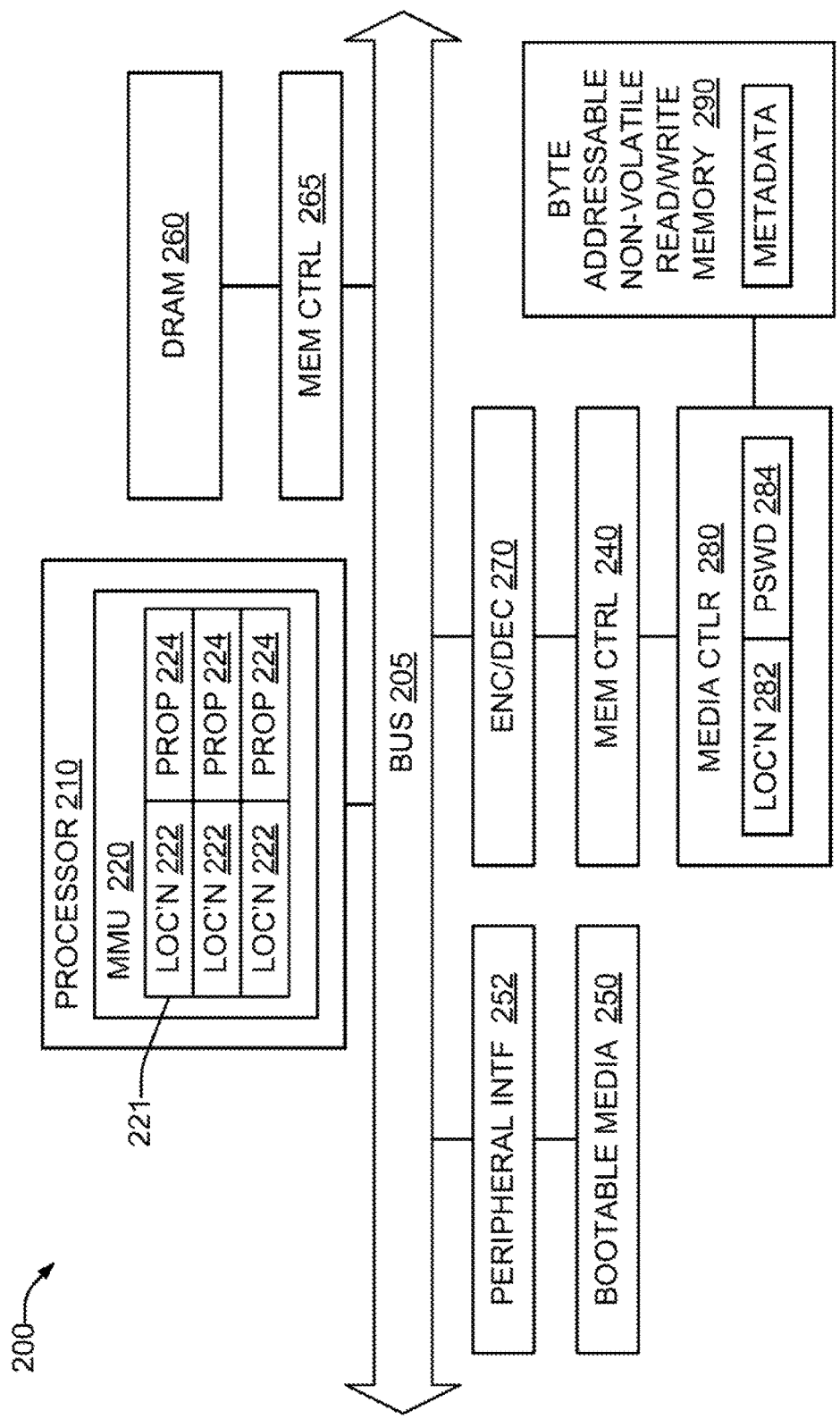
FIG. 2 is a block diagram of another computer having a byte-addressable non-volatile read-write main memory, in accordance with an example of the present disclosure.

Considering now another computer, and with reference to FIG. 2, a computer 200 includes a processor 210 and a byte-addressable non-volatile read-write (BANVRW) main memory 290. The processor 210 is communicatively coupled to a memory management unit (MMU) 220, which in some examples is internal to the processor 210. The processor 210 is communicatively coupled to a bus 205. The bus 205 may, in some examples, be a front side bus or a coherent bus. While a single processor is illustrated for clarity, in some example systems, such as a multi-core CPU, there may be multiple processors within the multi-core CPU. Each processor 210 may also contain, in some examples, a level 1 cache. The multi-core CPU may, in some examples, also include the bus 205, a level 2 cache, and a level 3 cache. The multiple processors and caches are omitted from FIG. 2 for clarity of illustration.

The computer 200 also includes other components extern to the processor 210 (or multi-core CPU). A memory controller 240 is communicatively coupled directly or indirectly to the bus 205. The memory controller 240 is in turn communicatively coupled to a media controller 280 for the main memory 290.

In some examples, the computer may include additional components. A peripheral interface 252 communicatively coupled to the bus 205 may be adapted to communicatively couple to external and typically removable media 250, such as for example a hard disk drive, a USB flash drive, or an EEPROM. In some examples the external media may contain one or more of a boot loader, an operating system, or a hypervisor, and the computer 200 may be configurable to boot from the external media 250 rather than from the main memory 290. In some examples, a jumper or a hardware flag in the computer 200 may determine whether the boot loader stored in the memory 290 or on the media 250 is to be used. The jumper or hardware flag may also, in some examples, determine whether the operating system or hypervisor is loaded from the memory 290 or the media 250. In other examples, the boot loader itself may determine whether the operating system or hypervisor is loaded from the memory 290 or from the media 250. The boot loader, operating system, and hypervisor are discussed subsequently in greater detail with reference to FIGS. 2-3.

In some examples, the computer 200 may also include volatile main memory 260, such as DRAM, that does not retain its prior data contents after power to the computer is cycled. The volatile main memory 260 may be used for storing, during operation of the computer 200, data that need not be retained after shutdown. The volatile main memory 260 may be used for storing program code which may be copied to, and then executed from, the volatile main memory 260. A memory controller 265 communicatively couples the volatile main memory 260 to the bus 205.

In some examples, the computer 200 may include an encryption/decryption module 270, which may be logically disposed between the bus 205 and the memory controller 240. The encryption/decryption module 270 encrypts data (or program code) written by the processor 210 to the memory 290 as it passes through the module 270 from the processor 210 to the memory 290, and decrypts data (or program code) read by the processor 210 as it passes through the module 270 from the memory 290 to the processor 210. The encryption/decryption module 270 implements the encryption standard (i.e. method) which is specified for the region of the main memory 290 that corresponds to the memory addresses which are read or written.

In some examples where the computer is a "System on a Chip" (SoC), this chip may include the processor 210 (or multi-core CPU), and one or more of the peripheral interface 252, the memory controllers 240, 265, and the encryption/decryption module 270.

Figure 3:
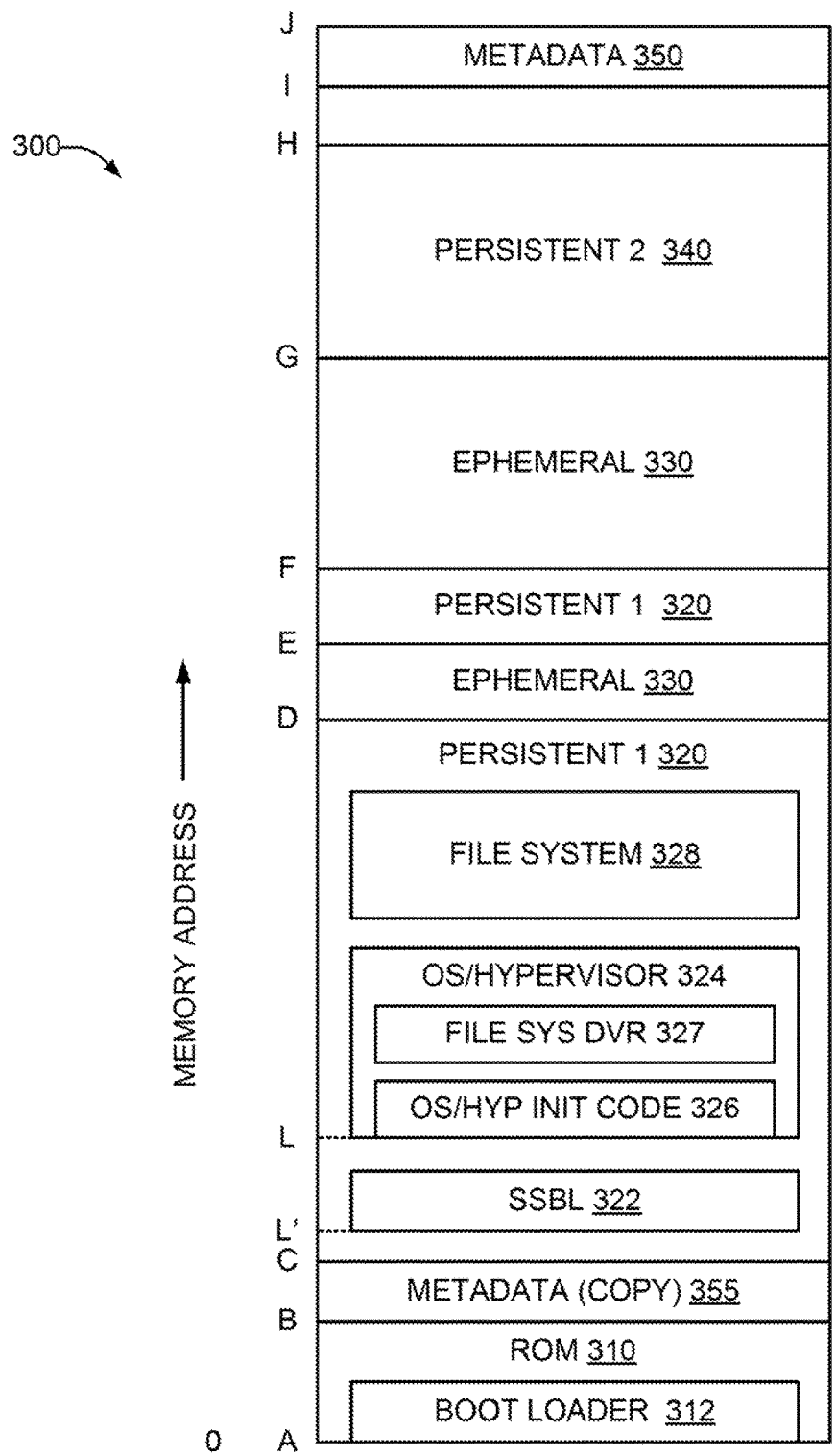
FIG. 3 is a block diagram of the partitioning of the byte-addressable non-volatile read-write main memory of FIG. 2 into plural regions in accordance with an example of the present disclosure.

Considering now one example partitioning of the byte-addressable non-volatile read-write main memory 290 into plural regions, and with further reference to FIG. 3, a number of regions are established. Each region has one or more address spaces of contiguous bytes of memory. Each region may be one of a number of different types: ROM, Persistent, Ephemeral, or Metadata. Other types of regions could be defined as well.

A ROM region may be used to store code for at least a portion of a boot loader. The portion may be, for example, a first-stage boot loader. The ROM region may also include code for certain management functions of the computer, such as a Basic Input Output System (BIOS) or Unified Extensible Firmware interface (UEFI). The ROM region may have the operational properties of read-only access, and maintaining its content in response to a shutdown of the computer. A capability may be implemented to update the contents of the ROM region (i.e. write to the ROM region) during a reboot using a trusted process, such as for example by supplying a password or setting a hardware jumper or flag. Typically, there is one ROM region in the memory. The contents of the region may be encrypted, although they are typically not.

A Persistent region is used to store programs and data that persist in the memory 290 after a shutdown of the computer, thus surviving boot cycles. The operating system and/or hypervisor for the computer are typically stored in a Persistent region. If a second-stage boot loader is used with the computer, it may also be stored in a Persistent region. Programs stored in a Persistent region may be configured to be executed in place in the region. In order to be executed in place, the program code is written to be independent of memory location, or aware of its location in memory, and to not modify during execution any memory that is located within its image. Alternatively, programs may be configured to be loaded into another memory location, for example the volatile main memory 260, and executed there. Programs and data stored in the Persistent region may be organized as files in a file system. In this context, a "file system" refers to a collection of files and directories in memory having a predefined structure of information. The file system, including the files stored therein, are accessed through a file system driver (i.e. through kernel file system modules that are part of the operating system and which are designed to manage the file system). Data may also be stored in the Persistent region as raw volumes whose formatting is specific to a particular program such as a database; these raw volumes are accessible through that program, rather than through the file system. The Persistent region may have the operational properties of at least read access during normal operation following the boot process, and maintaining its content in response to a shutdown of the computer. During the boot process, however, the Persistent region may be non-writable, in order to protect its contents from spurious write operations that may occur during the boot process. The contents of the region may or may not be encrypted. There may be any number of Persistent regions in the memory, but typically there is at least one.

An Ephemeral region is typically used to store data that is generated during operation of the computer and which is not expected to be maintained across power cycles. Some of the data may be, for example, generated by one or more of the boot loader, the operating system, or the hypervisor, among other program. Example data that may be stored in an Ephemeral region include data structures created by the kernel and user processes that are not intended to be maintained after a shutdown, such as page table entries used by the processor if and when paging is enabled. In some examples, programs may also be loaded into the Ephemeral region and executed there. The Ephemeral region may have the operational properties of at least read and write access, and discarding its contents in response to a shutdown of the computer. While a volatile memory, such as DRAM 260, inherently discards its data contents in response to power cycling of the computer, the non-volatile memory 290 does not. As a result, the contents of an Ephemeral region of a non-volatile memory may be either passively discarded or actively discarded, as discussed heretofore. The contents of the region may or may not be encrypted.

A Metadata region is used to store data that describes the partitioning of the byte-addressable non-volatile read-write main memory 290. The Metadata region typically has the operational properties of read-only access, and maintaining its content in response to a shutdown of the computer. There may be two or more identical copies of the Metadata region stored in the memory. The additional Metadata region(s) may be used for recovery purposes. The contents of the region may be encrypted, although they are typically not. A capability may be implemented to securely update the contents of the Metadata region to reconfigure the partitioning of the main memory 290 (i.e. manage the memory regions). In some examples, the reconfiguring may be done manually by an authorized user. In some examples, the reconfiguring may be performed automatically when it is recognized that there is insufficient free space in one of the Persistent regions or Ephemeral regions, and excess free space in another. By reconfiguring the region partitioning of the main memory 290, it may be possible to obtain sufficient space to avoid the overhead and performance penalties resulting from swapping programs or data to an external drive. The structure of the data stored in the Metadata region is discussed subsequently in greater detail with reference to FIGS. 4A-4B.

An example memory map 300 shows one partitioning of the byte-addressable non-volatile read-write main memory 290 into plural regions. The main memory 290 has a physical address range of A to J for the bytes of the memory. A memory address of zero corresponds to A, and the maximum memory address to J.

A ROM region 310 spans memory address range A to B. A first Persistent region 320 spans memory address ranges C to D, and E to F. An Ephemeral region 330 spans memory address ranges D to E, and F to G. A second Persistent region 340 spans memory address ranges G to H. A Metadata region 350 spans memory address range I to J, and a copy 355 of this region is replicated at memory address range B to C. The Metadata copy region 355 can be used to recover from corruption of the Metadata region 350.

The example memory map 300 illustrates several programs that may be stored in the main memory 290 and which are associated with the boot process of the computer. These programs are stored in the ROM region 310 and the first Persistent region 320. A boot loader 312 is stored in the ROM region 310 of the memory 290. The boot loader 312 is executable in place at a first predetermined location known to the processor 210. The predetermined location may be specific to the architecture of the computer. The illustrated boot loader 312 begins executing at address A (i.e. memory address zero).

The boot loader 312 is configured to load a higher-level module. In one example, the boot loader 312 is a first-stage boot loader (FSBL), and the higher-level module is a second-stage boot loader (SSBL) 322. In another example, the higher-level module is an operating system or hypervisor 324. The higher-level module is executable in place, at least in part, at its location in the Persistent region 320. The processor 210, typically via the boot loader 312, determines, from the contents of the Metadata region 350, the location in memory L of initialization code 326 for the operating system or hypervisor 324, or the location in memory L' of the start of the SSBL 322, as discussed subsequently in greater detail with reference to FIGS. 4A-4B. Control of execution is then transferred from the boot loader 312 to the higher-level module—either the init code 326 for the operating system or hypervisor 324 at address L, or the SSBL 322 at address L' which in turn eventually transfers control to the init code 326 at address L. The initialization code 326 may also initialize a file system driver 327 and mount a file system 328 of the computer such that the program and data files in the file system can be accessed. Some of the program files and data files stored in the persistent region 320 may be stored in the file system 328, and accessed using the file system driver 327.

Because the SSBL 322 and the operating system or hypervisor 324, are executable in place at the location in the Persistent region 320 at which they are stored, a step of loading these modules 322, 324 into memory at run-time is avoided. This step would be included in systems where the operating system or hypervisor is loaded into volatile memory from secondary storage prior to its execution.

In addition to the memory address A, the memory addresses B and I which correspond to the start of the Metadata regions 350, 355 are also predetermined. As a result, the boot loader 312 knows where to find the Metadata regions, and thus where to obtain the data that defines the region organization of the memory 290, and the address L or L'.

Returning now to the operation of the computer 200 with regard to enforcement of the access permissions for a region of the memory 290, and with reference to FIGS. 2-3, the computer 200 includes at least one enforcement mechanism. Each enforcement mechanism enforces at least one operational property defined for the various regions of the main memory 290 by the Metadata.

An access permission enforcement mechanism enforces the access permission operational property. In one example, the access permission enforcement mechanism of the computer 200 comprises the MMU 220 and the media controller 280. The MMU 220 translates the logical (or virtual) memory space seen by programs into physical addresses in memory, such as the memory 290, and provides memory protection by disallowing errant access to memory that the program should not have access to.

The MMU 220 may also enforce the access permission operational property to one or more regions of the main memory 290, including the Metadata, Persistent, Ephemeral, or ROM regions. For each region, there is a record in a table 221 which is stored in the MMU 220, or stored elsewhere in memory and accessible by the MMU 220. Each record contains a location field 222 and a property field 224. The location field 222 specifies the address range of the region, and the property field 224 specifies the access permission operational property. During operation, when a program requests to read or write a memory address in the main memory 290, the MMU 220 accesses the table 221 to determine if the memory address falls within one of the location fields 222. If so, the MMU 220 then determines if the requested memory access (read or write) is permitted based on the corresponding property field 224. If permitted, the memory access if allowed; but if not permitted, the memory access is disallowed. In some examples, the MMU 220 enforces the access permission operational property for memory accesses that made by a user-level program, but not for those made by an administrator-level program.

The location field 222 may be implemented in various ways. One way uses sub-fields of a starting physical address, and a block size following that physical address. The location field 222 may also include a starting logical address that corresponds to the starling physical address in order to implement the logical-to-physical address translation.

The MMU 220, including the table 221, may be configured during the boot process by one or more of the boot loader 312, the SSBL 322, and the operating system or hypervisor 324. Once the boot process has been completed, the access permissions as defined in the metadata for regions of the main memory 290 will be enforced. During the boot process itself, however, different access permissions may be established and enforced. For example, the metadata may specify that a Persistent region has both read and write access, but in order to ensure that the Persistent region will not be corrupted by a spurious (unintended) write operation that might occur during the boot process, an access permission of read-only may be assigned to the Persistent region during the boot process.

The media controller 280 may enforce a read-only access permission operational property for one or more regions of the main memory 290. Typically this is done for a ROM region. It may also be done for a Metadata region. The media controller 280, which may be separate from or fabricated together with the main memory 290, controls access to the fabric of the main memory 290. A write-protect mechanism of the media controller 280 (which enforced the read-only permission) may be configured with location information 282 that specifies one or more address ranges of the main memory 290 to which write accesses will be prohibited. When a write access is received by the media controller 280, the controller 280 determines whether the corresponding memory address falls within the location field 282. If so, the write access is disallowed; if not, the write access is permitted. The location field 282 has typically been configured before the boot process is performed, along with a password field 284.

In certain situations, it is desirable to allow write accesses to locations which are established as having read-only permission. One such situation is to update the boot loader 312 stored in the ROM region 310. Another is to modify the Metadata regions 350, 355 to reconfigure the regions of the main memory 290. Yet another is to repair the Metadata region 350 with the copy of information in the Metadata region 355. Typically these operations are performed during the boot process. A password is supplied with the request to write to the write-protected region. If the supplied password matches that stored in the password field 284 of the media controller 280, the write access is permitted.

An encryption enforcement mechanism enforces the encryption operational property. In one example, the encryption/decryption module 270 may implement a mechanism that uses a table similar to table 221 of the MMU 220 to enforce the encryption operational property. In this case, the encryption/decryption module 270 determines whether a memory access request passing through the module 270 falls within the address range of a region defined as being encrypted according to a specified standard. If so, the module 270 encrypts the data of write requests before passing them through to the memory 290, and decrypts the data returned from read requests before passing them through to the processor 210.

A content retention enforcement mechanism enforces the content retention operational property to maintain, or discard, the contents of a region in response to a shutdown. In one example, discarding is passively enforced by programs which write and read data that is stored in a region, such as Ephemeral region 330, which has a content retention operational property of "discard". These programs do not expect data from the prior boot to still be valid following a shutdown of the computer 200, and thus presume that it does not exist. In another example, discarding is actively enforced. One active mechanism may be a program that is executed by the processor 210 during the shutdown process and which erases the memory locations of regions having the content retention operational property of "discard". In regions that have both the content retention operational property of "discard" and the encryption property of "encrypt", an active discarding mechanism may discard the key(s) used to decrypt the contents without erasing the memory locations of the regions. Other active discarding mechanisms may be implemented in a hardware in the computer 200.

As has been noted, in some examples the computer 200 may also include volatile main memory 260, such as DRAM, that does not retain its prior data contents after power to the computer is cycled. For example, assume that the portion of the Ephemeral region 330 (FIG. 3) that spans address range D to E is mapped to the volatile main memory 260, rather than to the non-volatile main memory 290. In this case, the corresponding data set of the Metadata region 350, 355 stored in the main memory 290 refers to memory 260 which is external to the memory 290. The volatile main memory 260 may be used to receive and execute a copy of at least a portion of the SSBL 322, the operating system or hypervisor 324, or another program. The volatile main memory 260 may also be used to store data which is assured to be discarded when power to the computer 200 is cycled regardless of the content retention operational property specified for the corresponding region. However, specifying a content retention operational property of "discard" for the corresponding region will, in, the case of an active discarding mechanism, also discard the data during a reboot that occurs without power cycling the computer 200.

Figure 4A:
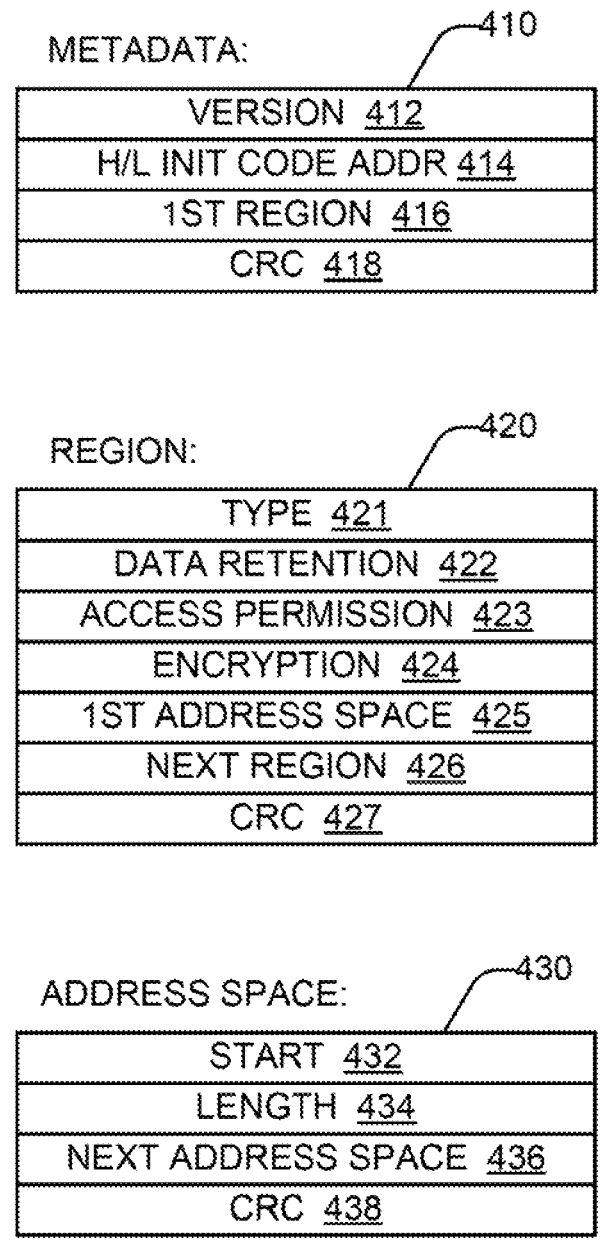
FIGS. 4A-4B are a schematic representation of a data structure stored in an example metadata region of the byte-addressable non-volatile read-write main memory of FIG. 2 that describes the plural regions of FIG. 3 in accordance with an example of the present disclosure.
Figure 4B:
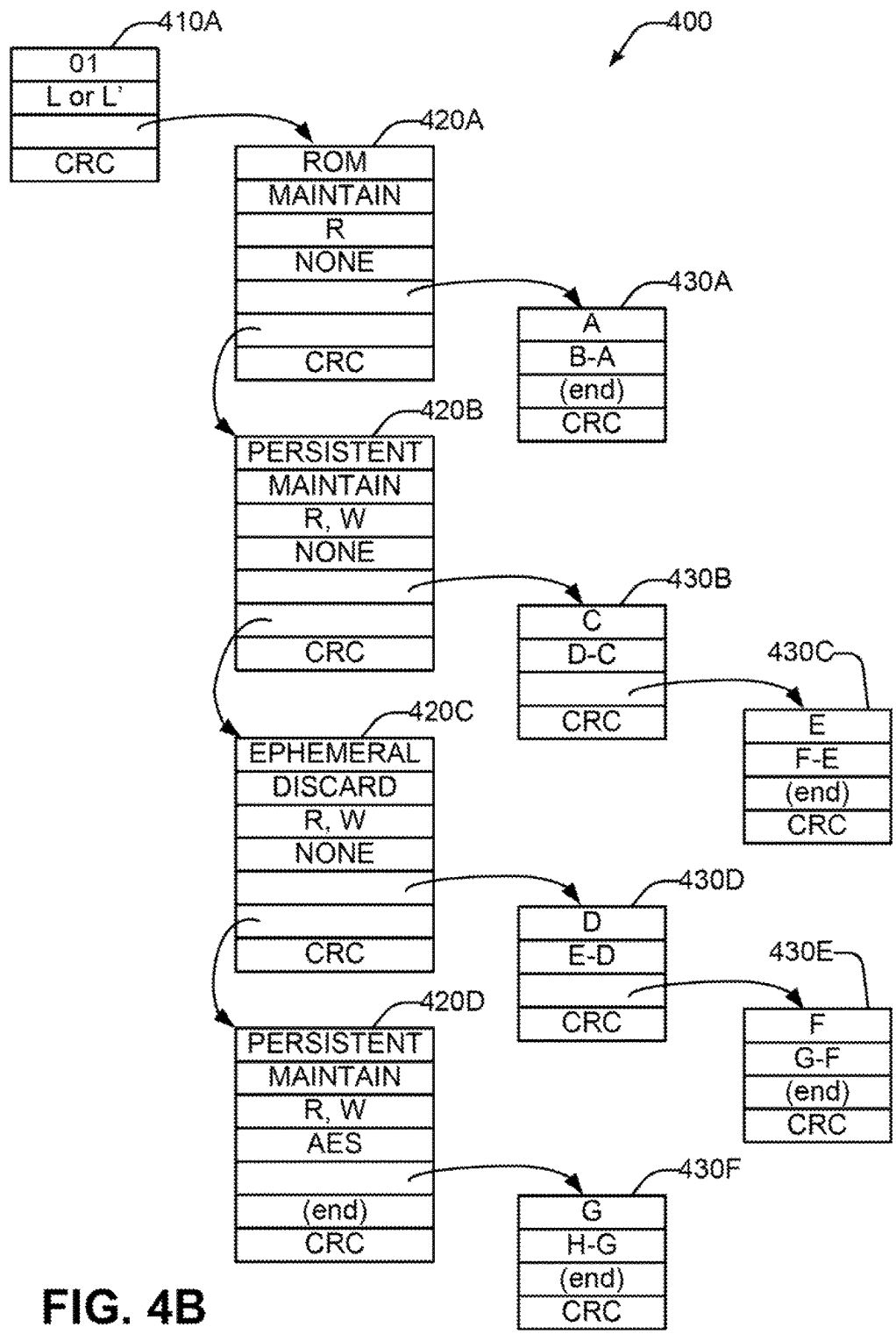

Considering now in further detail the content of the Metadata region, and with reference to FIGS. 3 and 4A-4B, an example metadata data structure 400 corresponds to the memory map 300. The data structure 400 may be a linked list. At the head of the list is a metadata entry 410. The metadata entry links to a region entry 420. A region entry 420 may link to another region entry 420. A region entry 420 may also link to an address space entry 430. An address space entry 430 may link to another address space entry 430. A data set of the metadata for a particular region of the memory comprises a region entry 420 and one or more address space entries 430.

Before considering the example metadata data structure 400 in greater detail, the various entries 410-430 used in the data structure 400 are considered with reference to FIG. 4A.

The metadata entry 410 has a version field 412, a higher-level module initialization code address field 414, a first region field 416 that links to a region entry 420, and a CRC field 418.

The version field 412 indicates the version number of the data structure 400. If the content of the data structure 400 evolves over time, the version can be used to provide backwards compatibility for memories that contain earlier versions of the metadata data structure 400. The higher-level module initialization code address field 414 stores the address of the higher-level module initialization code. Where the SSBL 322 is the higher-level module, the address field 414 stores the starting address L' of the SSBL 322. Where the operating system or hypervisor 324 is the higher-level module, the address field 414 stores the starting address L of its initialization code 326. The first region field 416 stores a pointer to the first region entry 420 of the metadata. The CRC field 418 stores a cyclic redundancy check value that is derived from the other fields of the metadata entry 410 and usable to verify the integrity of the metadata entry 410.

The region entry 420 has a region type field 421, a data retention operational property field 422, an access permission operational property field 423, an encryption operational property field 424, a first address space field 425 that links to an address space entry 430, a next region field 426 that links to another region entry 420, and a CRC field 427.

The region type field 421 specifies the type of region to which the region entry 420 corresponds: ROM, Ephemeral, or Persistent. Since the addresses of the Metadata regions 350, 355 are known, there may not be a region entry 420 for either of the Metadata regions 350, 355, although in some examples there could be. The data retention operational property field 422 specifies whether the data in the region will be maintained, or discarded, in response to a shutdown. The access permission operational property field 423 specifies whether read access and write access are permitted to memory addresses within the region. The encryption operational property field 424 specifies whether data stored in the region is encrypted, and if so, what type of encryption standard is utilized. The first address space field 425 stores a pointer to the first address space entry 430 of the region. The next region field 426 stores a pointer to the next region entry 420 of the metadata. A null pointer indicates the last region entry 420 in the linked list. The CRC field 427 stores a cyclic redundancy check value that is derived from the other fields of the region entry 420 and usable to verify the integrity of the region entry 420.

The address space entry 430 has a start address field 432, a length field 434, a next address space field 436 that links to another address space entry 430, and a CRC field 438.

The start address field 432 stores the first address of a range of memory addresses for the region. The length field 434 stores the length, typically in bytes, of the range of memory addresses for the region. Thus the span of a contiguous memory address portion of the region can be determined from the start address field 432 and the length field 434. The next address space field 436 stores a pointer to the next address space entry 430 of the region. A null pointer indicates the last address space entry 430 for the region. The CRC field 438 stores a cyclic redundancy check value that is derived from the other fields of the address space entry 430 and usable to verify the integrity of the address space entry 430.

Considering now the example metadata data structure 400 which corresponds to the memory map 300, and with reference to FIGS. 3 and 4B, the data set of region entry 420A and address space 430A define the ROM region 310. The data set of region entry 420E and address spaces 430B-C define the first Persistent region 320. The data set of region entry 420C and address spaces 430D-E define the Ephemeral region 330. The data set of region entry 420D and address space 430F define the second Persistent, region 340.

There are a number of reasons why the metadata might define multiple Persistent or Ephemeral regions. Multiple regions might have different operational properties; for example, one persistent region might be encrypted (as in region entry 420D for the second persistent region 340), while another persistent region might not be encrypted (as in region entry 420B for the first persistent region 320. Or, in a computer that can dual-boot to two different operating systems, one Persistent region may correspond to the first operating system, and the other Persistent region may correspond to the second operating system. There are also a number of reasons why the metadata might define multiple address spaces within a region. For example, one address space 430 of the Ephemeral region 330 might correspond to a portion of the non-volatile main memory 290, while another address space 430 of the Ephemeral region 330 might correspond to at least a portion of the volatile main memory 260.

During the boot process, or at other times, the integrity of the data in a Metadata region 350, 355 may be checked by calculating, for each entry 410, 420, 430, the corresponding CRC value, and comparing the calculated CRC value to the value stored in the corresponding CRC field 418, 427, 438. If any CRC value does not match, then at least the corresponding entry 410, 420, 430 has been corrupted. If the contents of Metadata region 350, for example, are corrupted, some or all of the valid contents of Metadata region 355 may be copied to Metadata region 350 so as to recover from the corruption.

Figure 5A:
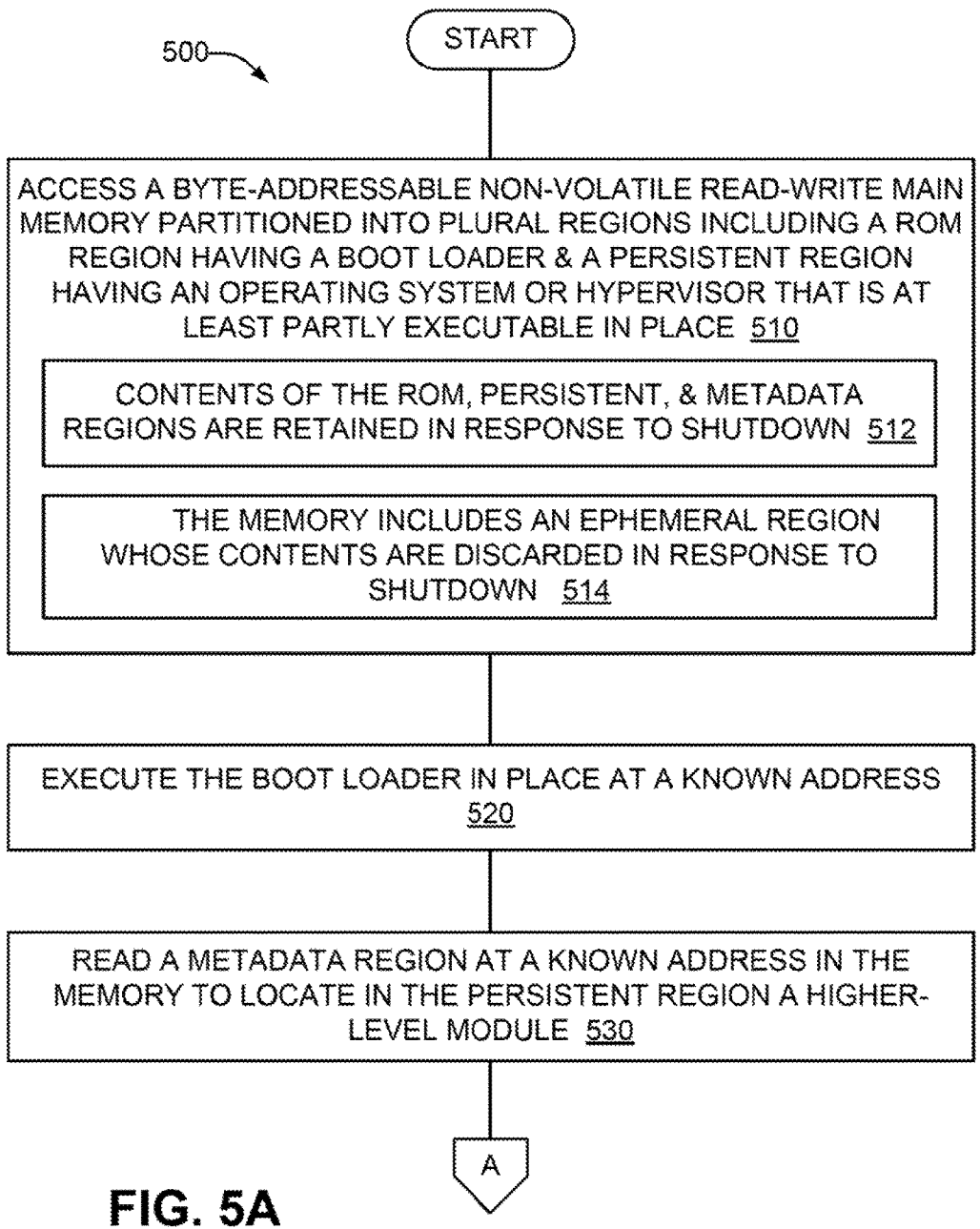
FIGS. 5A-5B are flowcharts of a method of booting the computer system of FIG. 1 or 2, in accordance with an example of the present disclosure.
Figure 5B:
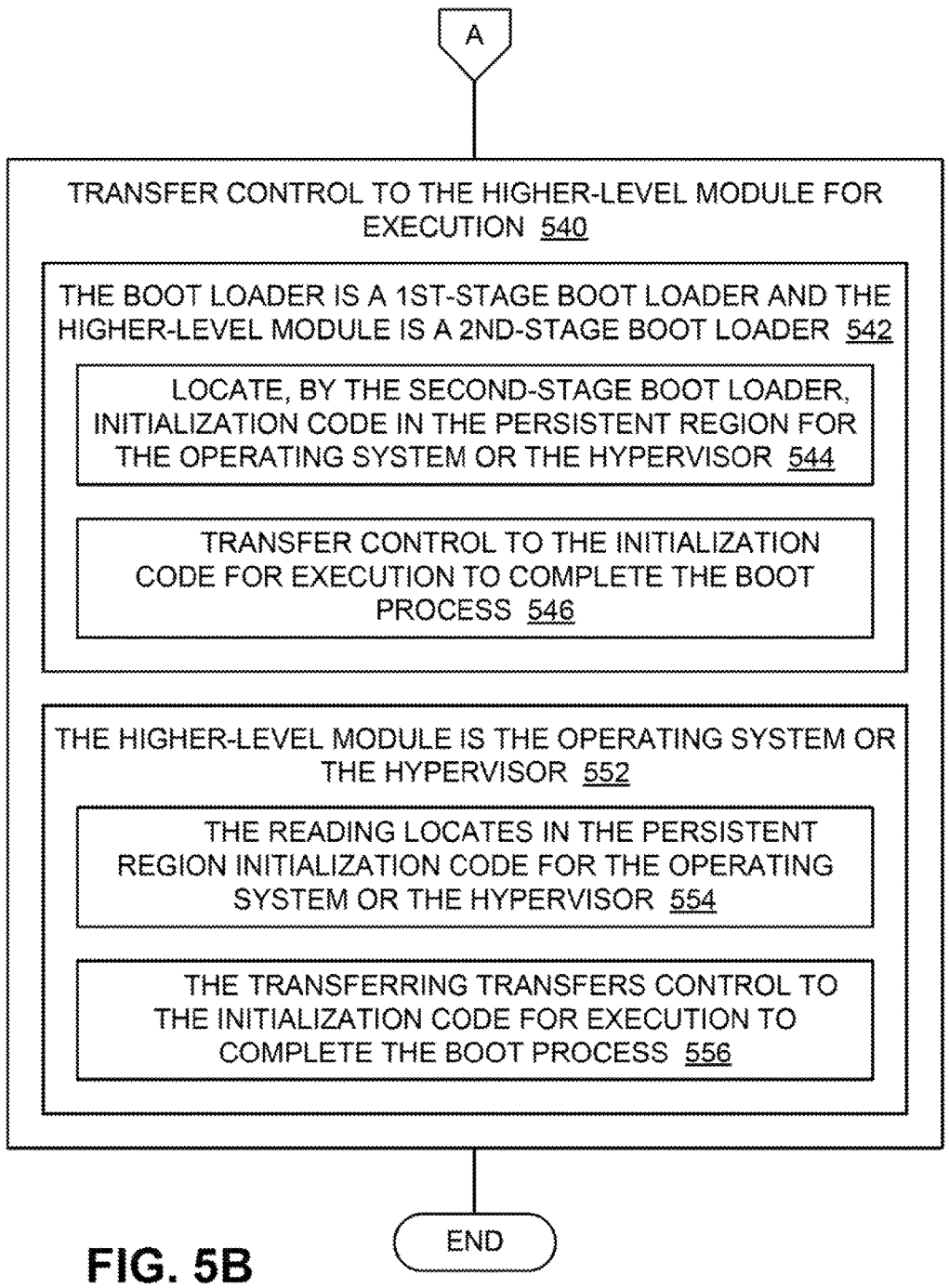

Consider now, and with reference to FIGS. 5A-5B, a flowchart of a boot process for a computer. Alternatively, the flowchart of FIGS. 5A-5B may be considered as steps in a method 500 of booting the computer. In some examples, the computer may be the computer 200 (FIG. 2). The method 500 begins at 510 by accessing, with a processor of the computer, a byte-addressable non-volatile read-write main memory that is communicatively coupled to the processor. The memory is partitioned into plural regions. A ROM region includes a boot loader. A persistent region contains an operating system or a hypervisor that is at least partly executable in place in the main memory. In some examples, at 512, the contents of the ROM region, the Persistent region, and a Metadata region are retained in response to a shutdown of the computer. In some examples, at 514, the main memory also includes an Ephemeral region whose contents are discarded in response to the shutdown.

At 520, the boot loader is executed in place in the main memory. The address location in the main memory of the start of the executable code of the boot loader is known to the processor, as discussed previously with regard to the example memory map 300 (FIG. 3).

At 530, a Metadata region in the main memory is read in order to locate a higher-level module that resides in the Persistent region. The address location of the beginning of the Metadata region is also known to the processor as instructed by the boot loader, as discussed previously with regard to the example memory map 300 (FIG. 3). Locating the higher-level module may include determining the address location in the main memory of the start of the executable code for the higher-level module, such as for example its initialization code.

At 540, control is transferred to the higher-level module for execution. For example, the processor may be directed to continue execution at the address location of the start of the executable code for the higher-level module. In some examples, part or all of the higher-level module is executed in place in the Persistent region. In some examples, part or all of the higher-level module may be copied to another memory, such as a volatile main memory, or to another region, such as an Ephemeral region, and executed where loaded into that memory or region.

In some examples, at 542, the boot loader is a first-stage boot loader (FSBL) and the higher-level module is a second-stage boot loader (SSBL). At 544, the SSBL locates the initialization code in the Persistent region for the operating system or hypervisor by reading the Metadata region. For example, the SSBL may be preconfigured to know that the initialization code starts at a fixed offset from its own starting address, which can in turn be determined from the higher-level module initialization code address field 414 of the metadata entry 410. At 546, control is transferred from the SSBL to the operating system or hypervisor initialization code in order to continue and eventually complete the boot process.

In some examples, at 552, the higher-level module is the operating system or hypervisor. At 554, the initialization code for the operating system or hypervisor in the Persistent region is located by the boot loader by reading the Metadata region. For example, the start of the executable initialization code may be obtained from the higher-level module initialization code address field 414 of the metadata entry 410. At 556, control is transferred from the boot loader to the operating system or hypervisor initialization code in order to continue and eventually complete the boot process.

The SSBL and/or the operating system or hypervisor initialization code may perform other functions that are part of the boot process, such as for example initializing the file system. Once initialized, the file system may be used to locate program or data stored in e.g. the Persistent region, including programs or data which may be part of the boot process.

In some examples, one or more blocks or steps discussed herein are automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

From the foregoing it will be appreciated that the computers and methods provided by the present disclosure represent a significant advance in the art. Although several specific examples have been described and illustrated, the disclosure is not limited to the specific methods, forms, or arrangements of parts so described and illustrated.

For instance, examples of the disclosure are not limited to computers with a single processor. While a single processor is illustrated for clarity in FIGS. 1-2, other example systems may include a multi-core CPU, where each core includes a processor. In some cases, multiple cores may operate to boot a single operating system or hypervisor. In such cases, one of the cores (referred to as the "boot core" or "core 0") executes the boot process disclosed herein while the other cores do not participate. When the kernel of the operating system or hypervisor takes system control, it enables the other cores in the appropriate manner. All cores will then follow the same current system configuration, including equal sharing of the memory (including the regions) and the hardware resources (such as the bus 205, memories 260, 290, the encryption/decryption module 270, and other hardware components).

In other cases, multiple cores may each operate to boot, according to the boot process disclosed herein, a different instance of an operating system or hypervisor. Cores which are configured to boot the various operating systems do so independently of each other. Each core accesses boot code from the fixed memory region which is assigned to that core; the memory region may or may not be the same among the different cores. Each operating system and/or hypervisor is independent of the others. In these cases, memory and other hardware resources may not be shared equally among the cores.

Furthermore, examples of the disclosure are not limited to personal, desktop, laptop, notebook, client, or server computers, but are applicable to the computers used in a wide variety of devices including but not limited to cell phones, smart phones, personal digital assistants, and electronic or electromechanical devices of all types which have embedded computers. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:

1. A computer comprising:
    a processor; and
    a byte-addressable non-volatile read-write main memory coupled to the processor, the memory partitioned into plural regions, each region having at least one defined operational property,
    wherein at least one of the plural regions is a metadata region having a linked data structure to store plural data sets, each data set specifying a location in the memory and the at least one defined operational property, of a corresponding one of the plural regions by including a region entry and one or more address space entries of the corresponding one of the plural regions,
    wherein the metadata region of the memory comprises the region entry of each of the plural data sets, the region entry of each of the plural data sets comprising a next region field that stores a pointer to a next region entry in the linked data structure or a null pointer indicating that the region entry is the last region entry in the linked data structure,
    wherein the region entry of each of the plural data sets comprises a first address space field that stores a pointer to a first address space entry of the one or more address space entries of a corresponding one of the plural data sets in the linked data structure, and
    wherein at least one of the plural regions corresponding to a single region entry has at least the operational property of being a persistent region and is set to allow programs and data stored in the at least one of the plural regions to be organized as files in a file system.

2. The computer of claim 1, wherein the at least one defined operational property includes at least one type of permissible access by the processor to memory addresses within the corresponding region.

3. The computer of claim 1, wherein the at least one defined operational property includes a content retention property of the corresponding region in response to a shutdown of the computer.

4. The computer of claim 1, wherein the at least one defined operational property includes an encryption type applied to contents of the corresponding region.

5. The computer of claim 1, wherein the computer enforces the operational property of the plural regions in accordance with the plural data sets of the metadata region.

6. The computer of claim 1, wherein the metadata region has a first operational property of read-only access, and a second operational property of maintaining content in response to a shutdown of the computer.

7. The computer of claim 1, wherein the at least one of the plural regions include:
    a ROM region to store at least a portion of a boot loader, the ROM region having the operational property of read-only access, and maintaining content in response to a shutdown of the computer;
    a persistent region to store an operating system or hypervisor, the persistent region having the operational property of at least read access during normal operation, and maintaining content in response to a shutdown of the computer; and
    an ephemeral region to store data generated during operation of the computer by at least one of the boot loader, the operating system, or the hypervisor, the ephemeral region having the operational property of at least read and write access, and discarding content in response to a shutdown of the computer.

8. The computer of claim 1, comprising:
    an external ephemeral region in a volatile read-write main memory coupled to the processor, the external ephemeral region to receive and execute a copy of at least a portion of an operating system or a hypervisor, the external ephemeral region having the operational property of at least read and write access, and wherein the metadata region further includes a data set corresponding to the external ephemeral region.

9. The computer of claim 1, wherein the metadata region of the memory further comprises each address space entry in the one or more address space entries for each of the plural data sets, each address space entry in the one or more address space entries comprising a next address space field, wherein the next address space field in any one of the one or more address space entries stores a pointer to a next address space entry in the one or more address space entries or a null pointer indicating that the any one of the one or more address space entries is the last address space entry in the one or more address space entries.

10. A computer comprising:
a processor;
a byte-addressable non-volatile read-write main memory coupled to the processor, the memory partitioned into plural distinct regions;
a boot loader stored in a ROM region of the memory and executable in place at a first predetermined location;
a higher-level module stored in a persistent region of the memory and at least in part executable in place in the persistent region;
wherein the memory includes a metadata region having a linked data structure to store plural data sets, the metadata region starting at a second predetermined location and specifying a location in the memory of the higher-level module, and wherein each data set specifies a location in the memory, and at least one defined operational property of a corresponding one of the plural regions by including a region entry and one or more address space entries of the corresponding one of the plural regions,
wherein the metadata region of the memory comprises the region entry of each of the plural data sets, the region entry of each of the plural data sets comprising a next region field that stores a pointer to a next region entry in the linked data structure or a null pointer indicating that the region entry is the last region entry in the linked data structure,
wherein the region entry of each of the plural data sets comprises a first address space field that stores a pointer to a first address space entry of the one or more address space entries of a corresponding one of the plural data sets in the linked data structure, and
wherein at least one of the plural regions corresponding to a single region entry has at least the operational property of being a persistent region and is set to allow programs and data stored in the at least one of the plural regions to be organized as files in a file system.

11. The computer of claim 10, wherein each data set also specifies a content retention characteristic for the corresponding region, the computer further comprising:
a content retention enforcement mechanism to enforce, for each region, the corresponding content retention characteristic for the region in response to a shutdown of the computer.

12. The computer of claim 10, wherein the metadata region of the memory further comprises each address space entry in the one or more address space entries for each of the plural data sets, each address space entry in the one or more address space entries comprising a next address space field, wherein the next address space field in any one of the one or more address space entries stores a pointer to a next address space entry in the one or more address space entries or a null pointer indicating that the any one of the one or more address space entries is the last address space entry in the one or more address space entries.

13. The computer of claim 10, wherein the metadata region of the memory comprises a metadata entry comprising a pointer to a region entry in a first one of the plural data sets and a higher-level module initialization code address field containing an address in the memory for the higher-level module or an initialization code for the higher-level module.

14. The computer of claim 13, wherein the metadata entry comprises a CRC field that stores a cyclic redundancy check value that is derived from the other fields of the metadata entry and is usable to verify the integrity of the metadata entry.

15. A method of booting a computer, the method comprising:
accessing, with a processor of the computer, a byte-addressable non-volatile read-write main memory coupled to the processor, the memory partitioned into plural regions, each region having at least one defined operational property, wherein the plural regions include a ROM region that includes a boot loader and a persistent region that contains an operating system or a hypervisor that is at least partly executable in place;
executing the boot loader in place at a known address in the ROM region;
reading, by the boot loader, a metadata region at a known address in the memory to locate in the persistent region of the plural regions a higher-level module, wherein the metadata region comprises a linked data structure to store plural data sets, each data set specifying a location in the memory, and the at least one defined operational property of a corresponding one of the plural regions by including a region entry and one or more address space entries of the corresponding one of the plural regions;
configuring the region entry of each of the plural data sets to include a next region field that stores a pointer to a next region entry in the linked data structure or a null pointer indicating that the region entry is the last region entry in the linked data structure;
configuring the region entry of each of the plural data sets to include a first address space field that stores a pointer to a first address space entry of the one or more address space entries of a corresponding one of the plural data sets in the linked data structure; and
transferring control to the higher-level module for execution,
wherein at least one of the plural regions corresponding to a single region entry has at least the operational property of being a persistent region and is set to allow programs and data stored in the at least one of the plural regions to be organized as files in a file system.

16. The method of claim 15, wherein the boot loader is a first-stage boot loader, and wherein the higher-level module is a second-stage boot loader, the method further comprising:
locating, by the second-stage boot loader, initialization code in the persistent region for the operating system or the hypervisor; and
transferring control to the initialization code for execution to complete the boot process.

17. The method of claim 15, wherein the higher-level module is the operating system or hypervisor,
wherein the reading locates in the persistent region initialization code for the operating system or the hypervisor, and wherein the transferring transfers control to the initialization code for execution to complete the boot process.

18. The method of claim 15, wherein the higher-level module is executed in place in the persistent region.

19. The method of claim 15, wherein the contents of the ROM region, the persistent region, and the metadata region are retained in response to a shutdown of the computer, and wherein the memory includes an ephemeral region to store data generated during operation of the computer, and wherein the contents of the ephemeral region are discarded in response to a shutdown of the computer.

20. The method of claim 15, further comprising:

providing for each address space entry in the one or more address space entries to include a next address space field, wherein the next address space field in any one of the one or more address space entries stores a pointer to a next address space entry in the one or more address space entries or a null pointer indicating that the any one of the one or more address space entries is the last address space entry in the one or more address space entries.

* * * * *